US008543228B2

(12) United States Patent
Ojanpera

(10) Patent No.: US 8,543,228 B2
(45) Date of Patent: Sep. 24, 2013

(54) CODED DOMAIN AUDIO ANALYSIS

(75) Inventor: Juha Ojanpera, Luuppikatu (FI)

(73) Assignee: Nokia Corporation (FI)

( * ) Notice: Subject to any disclaimer, the term of this patent is extended or adjusted under 35 U.S.C. 154(b) by 1378 days.

(21) Appl. No.: 11/697,584

(22) Filed: Apr. 6, 2007

(65) Prior Publication Data
US 2008/0249976 A1    Oct. 9, 2008

(51) Int. Cl.
*G06F 17/00*    (2006.01)
(52) U.S. Cl.
USPC ............................................................. 700/94
(58) Field of Classification Search
USPC ..................... 700/94; 704/231, 239, 240
See application file for complete search history.

(56) References Cited

U.S. PATENT DOCUMENTS

| | | | | |
|---|---|---|---|---|
| 6,604,072 | B2* | 8/2003 | Pitman et al. ................. | 704/231 |
| 2003/0191764 | A1* | 10/2003 | Richards ....................... | 707/100 |
| 2005/0091275 | A1* | 4/2005 | Burges et al. ............... | 707/104.1 |
| 2005/0273326 | A1* | 12/2005 | Padhi et al. ................... | 704/231 |
| 2005/0273328 | A1* | 12/2005 | Padhi et al. ................... | 704/239 |

OTHER PUBLICATIONS

Shieh, Jyh-Ren Jerry, Audio Content Based Feature Extraction on Subband Domain, 2003, pp. 552-555, IEEE, USA.
Burges, Christopher J.C., et al., Using Audio Fingerprinting for Duplicate Detection and Thumbnail Generation, Mar. 2005, pp. 1-4, Microsoft Research, USA.
Kiranyaz Serkan et al. A Generic Audio Classification and Segmentation Approach for Multimedia Indexing and Retrieval, 2005, pp. 1-35, USA.
Tzanetakis, George, Manipulation, Analysis and Retrieval Systems for Audio Signals, Jun. 2002, pp. 1-198, USA.

* cited by examiner

*Primary Examiner* — Andrew C Flanders
(74) *Attorney, Agent, or Firm* — Banner & Witcoff, Ltd.

(57) ABSTRACT

The present invention provides methods, computer-readable media, and apparatuses for determining a measure a similarity of the audio content of a plurality of files. Quantized samples are converted to energy values from files having audio content with compressed formats. Energy characteristics are determined from the energy values and are matched to obtain a greatest content match for a plurality of delay instances. A selected delay value corresponds to a determined offset between the files for relating the audio content of the files. A degree of similarity is determined to relate the audio content of the files. A frequency spectrum is partitioned into a plurality of frequency bands, and a total energy value is determined for each frequency band. The total energy values are correlated for the files.

26 Claims, 7 Drawing Sheets

600

```
┌─────────────────────────────────────┐
│   For each reference candidate      │
│                              601    │
└─────────────────────────────────────┘
    ┌─────────────────────────────────────┐
    │  Find best content match at         │
    │    different delay instances        │
    │  603                                │
    └─────────────────────────────────────┘
        ┌──────────────────────────┐
        │   Select best delay      │
        │                   605    │
        └──────────────────────────┘

┌─────────────────────────────────────┐
│  Select best match between          │
│     reference candidates            │
│  607                                │
└─────────────────────────────────────┘
```

*FIG. 6*

CODED DOMAIN AUDIO ANALYSIS

FIELD OF THE INVENTION

The present invention relates to determining whether files having audio content are similar.

BACKGROUND OF THE INVENTION

With the proliferation of multimedia devices (e.g., handhelds and multimedia computers) users are accessing more and more audio data in different compressed formats. Audio recordings are typically stored in compressed format rather than in a raw sampled format because of huge memory resources that are required. Moreover, the introduction of higher sample rates, stereo channels, and multi-channels can be practically handled only by using compressed formats.

A user often has many files to access, where some of the files having audio content may be essentially duplicates. Moreover, files may have related audio content. For example, files may be associated into different audio categories including speech and music Categories may be further partitioned into the instrumental classification of the audio content. Thus, there is a real need for gauging similarities of files having audio content in order to categorize the files in order to better utilize memory resources.

BRIEF SUMMARY OF THE INVENTION

An aspect of the present invention provides methods, computer-readable media, and apparatuses for determining a measure a similarity of the audio content of a plurality of files.

With another aspect of the invention, quantized samples are converted to energy values from a first file and a second file having audio content with compressed formats. Energy characteristics are determined from the energy values and are matched to obtain a greatest content match for a plurality of delay instances. A selected delay value corresponds to a determined offset between the first file and the second file for relating the audio content of the two files.

With another aspect of the invention, a degree of similarity is determined to relate the audio content of the first and second files.

With another aspect of the invention, a bit stream is sampled at a sub-sampled rate by determining a limited number of quantized samples to be extracted from the bit stream.

With another aspect of the invention, quantized samples are de-quantized to obtain corresponding amplitude levels. With a stereo audio signal, de-quantized samples are combined from a right channel and a left channel to form the energy values.

With another aspect of the invention, a frequency spectrum is partitioned into a plurality of frequency bands, and a total energy value is determined for each said frequency band for the first file and the second file. The total energy values are correlated for the first and second files.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein:

FIG. 6 shows a process for matching energy characteristics for two files having audio content in accordance with an embodiment of the invention.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
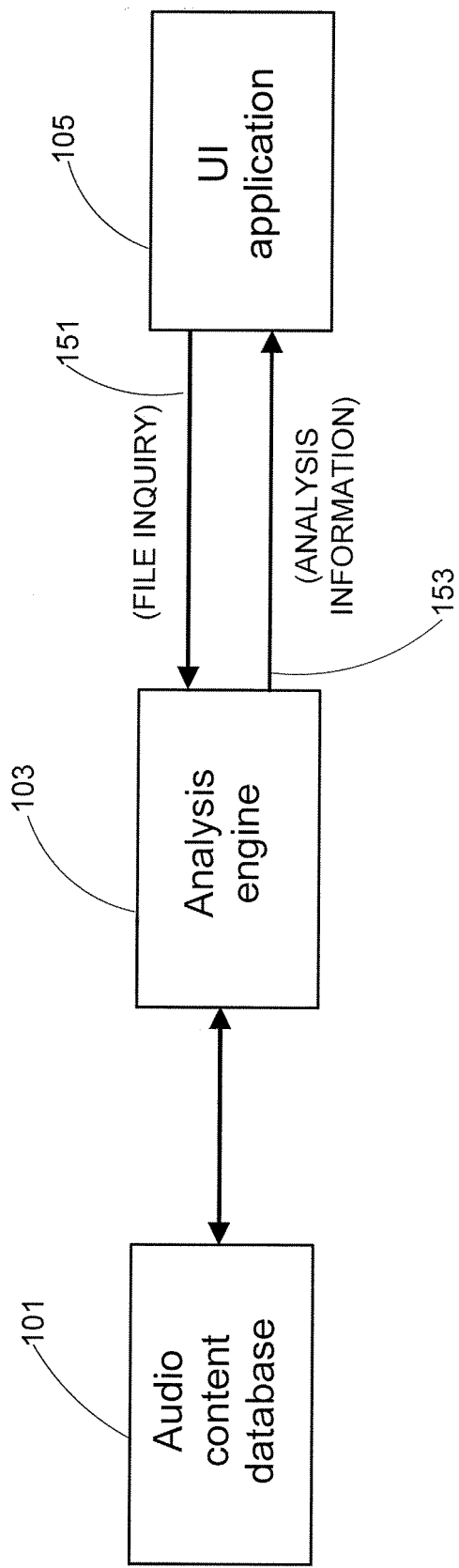
FIG. 1 shows a system for analyzing files with audio content in accordance with an embodiment of the invention.

FIG. 1 shows system 100 for analyzing files with audio content in accordance with an embodiment of the invention. Audio content analysis system 100 contains audio content database 101 and analysis engine 103 to extract information about the database content. Database 101 and analysis engine 103 may be located on a network or on a device. Analysis engine 103 inputs one or more audio content data and outputs analysis information 153 (in response to file inquiry 151 from UI application 105) that may include basic sample rate or bit rate data to a more complex analysis of the audio content. Examples of more complex analysis may be content breakdown into speech, music and silence parts, or instrumental classification of the content.

As will be discussed, system 100 executes processes in a coded domain to determine whether coded audio files are similar with each other and, in case they are similar, what is the delay between the files.

With uncompressed files the task of determining similarity and content delay is typically straight-forwarded. For example, to find the delay between files, one can determine a delay for time samples that minimizes the difference over a given time window. One drawback to this approach is that full content decoding must be performed before any content analysis can be applied. However, decoding may require substantial major computational complexity. Furthermore, decoded content typically requires substantial memory capacity, and thus files with audio content are typically compressed for storage efficiency.

Typical applications for compressed files include content sharing, editing and description. As the amount of audio content (user generated, downloaded, etc.) is continuously increasing, new ways of describing and indexing the content becomes more and more important. Other applications are directed to a service program with collaborative and community driven storytelling with mobile multimedia devices. One objective of the service program is to allow users to send their own videos/audio about important issues/events to the news service. Consequently, large amount of content is most likely available from the same audio-visual scene which needs to be segmented for better user consumption. Audio analysis is therefore an important part in performing accurate segmentation of the content.

As will be discussed, system 100 performs the following processes in order to determine whether files have similar audio content:
- Conversion of quantized samples to energy values
- Total energy calculation across selected frequency bands in sub-sampled domain
- Energy matching scheme to find correlation and delay between the content, if any System 100 determines whether two files have similar audio content, and if so, the content delay between the files. As discussed previously, processed files typically have a compressed format, including Advanced Audio Coding (AAC), Enhanced accPlus (eAAC+), MPEG-1 Layer III (MP3), and Windows Media Audio (WMA).

While system 100 analyzes files with audio content, system 100 may also analyze files with multi-media files having content for multiple media (e.g., video and audio or image and audio).

Figure 2:
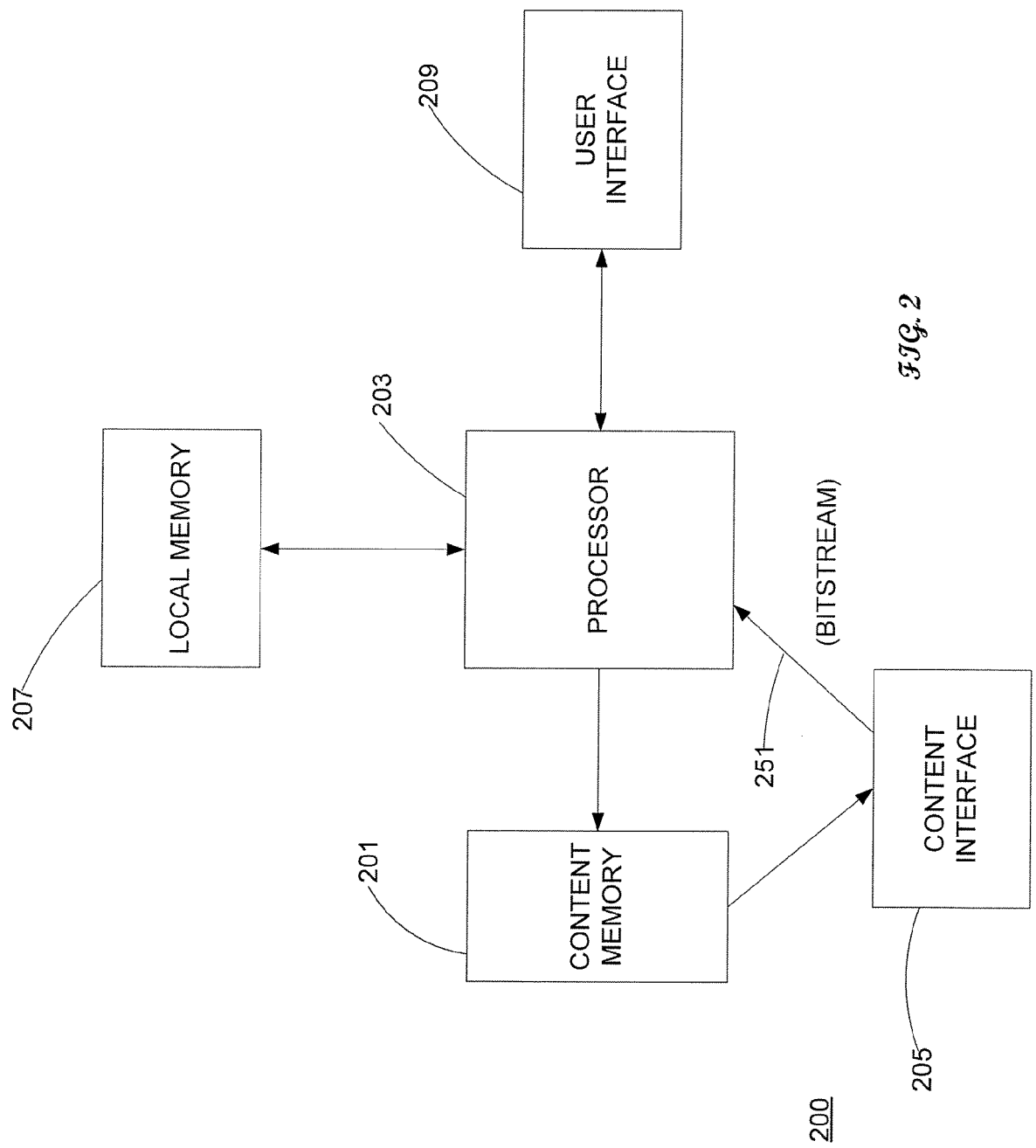
FIG. 2 shows a computer system for analyzing files with audio content in accordance with an embodiment of the invention.

FIG. 2 shows computer system 200 for analyzing files with audio content in accordance with an embodiment of the invention. The files are stored in content memory 201, which typically has sufficient memory capability for storing large files with multi-media content. Processor 203 accesses content memory 201 and obtains bit stream 251 that contains content through content interface 205. Although FIG. 2 shows content interface 205 as a separate logical component, content interface 205 may be incorporated into processor 203 by processor performing a parallel to serial conversion.

Processor 203 performs processes, e.g., process 700 as will be discussed, by executing computer-executable instructions from local memory 207. Processor 203 receives file inquiry 151 from user interface 209 and provides analysis information 153 to user interface 209.

While FIG. 2 shows computer system 200 processing audio content from files accessed from content memory 201, embodiments of the invention support other sources of audio content, e.g., as a bit stream received over a radio channel, which may be processed essentially in real time or may be processed after receiving the bit stream.

Figure 3:
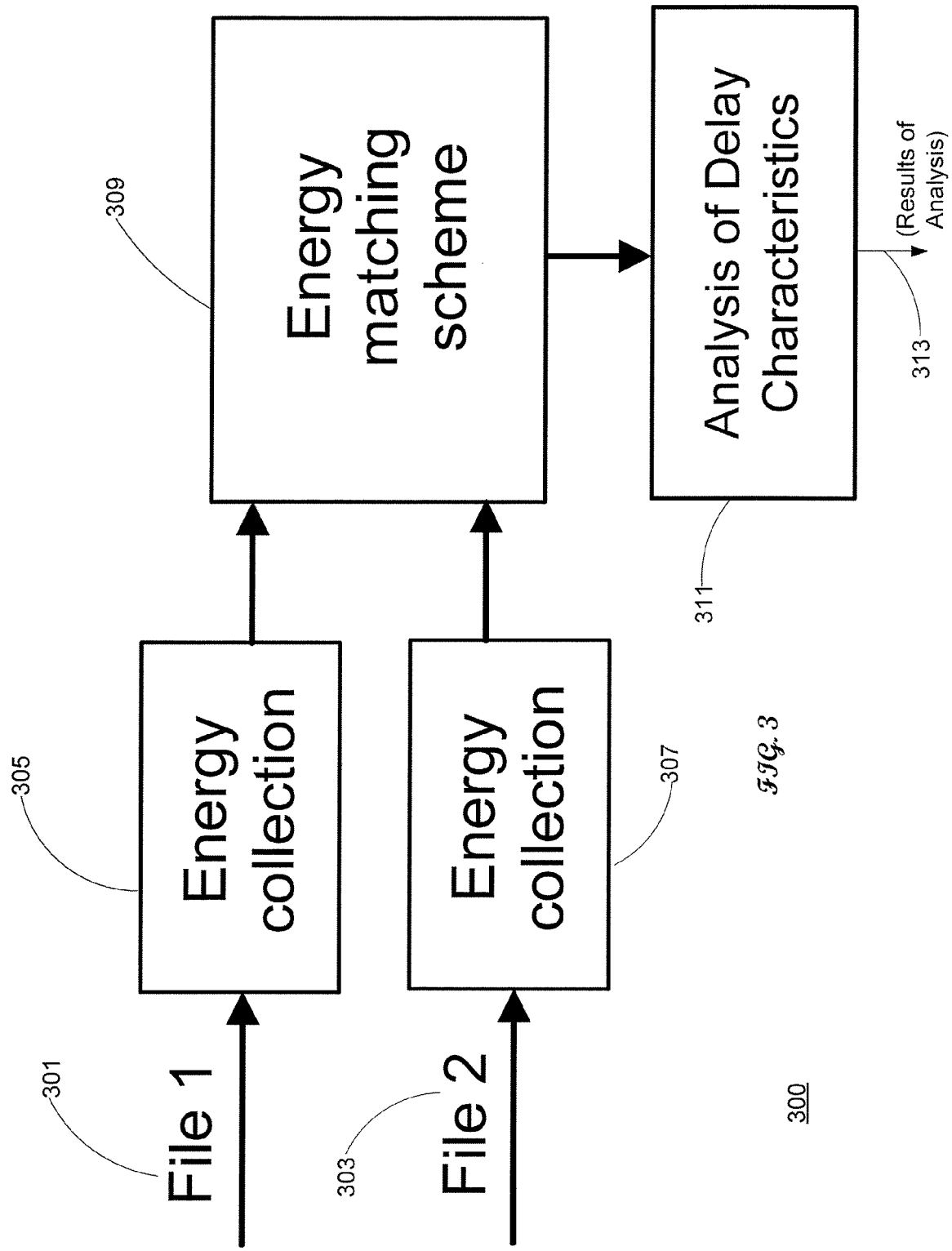
FIG. 3 shows a high-level block diagram of two files having audio content in accordance with an embodiment of the invention.

FIG. 3 shows high-level block diagram 300 of files 301 and 303 having audio content in accordance with an embodiment of the invention. Energy data is collected by energy collection modules 305,307 from the compressed files 301 and 303. Energy matching module 309 is then applied to the data to determine whether files 301, 303 are similar or not. When files 301 and 303 have similar audio content, analysis module 311 provides a delay value and a file identification (301b or 303b) to which the delay is associated are returned in analysis results 313 through user interface 209.

Figure 4:
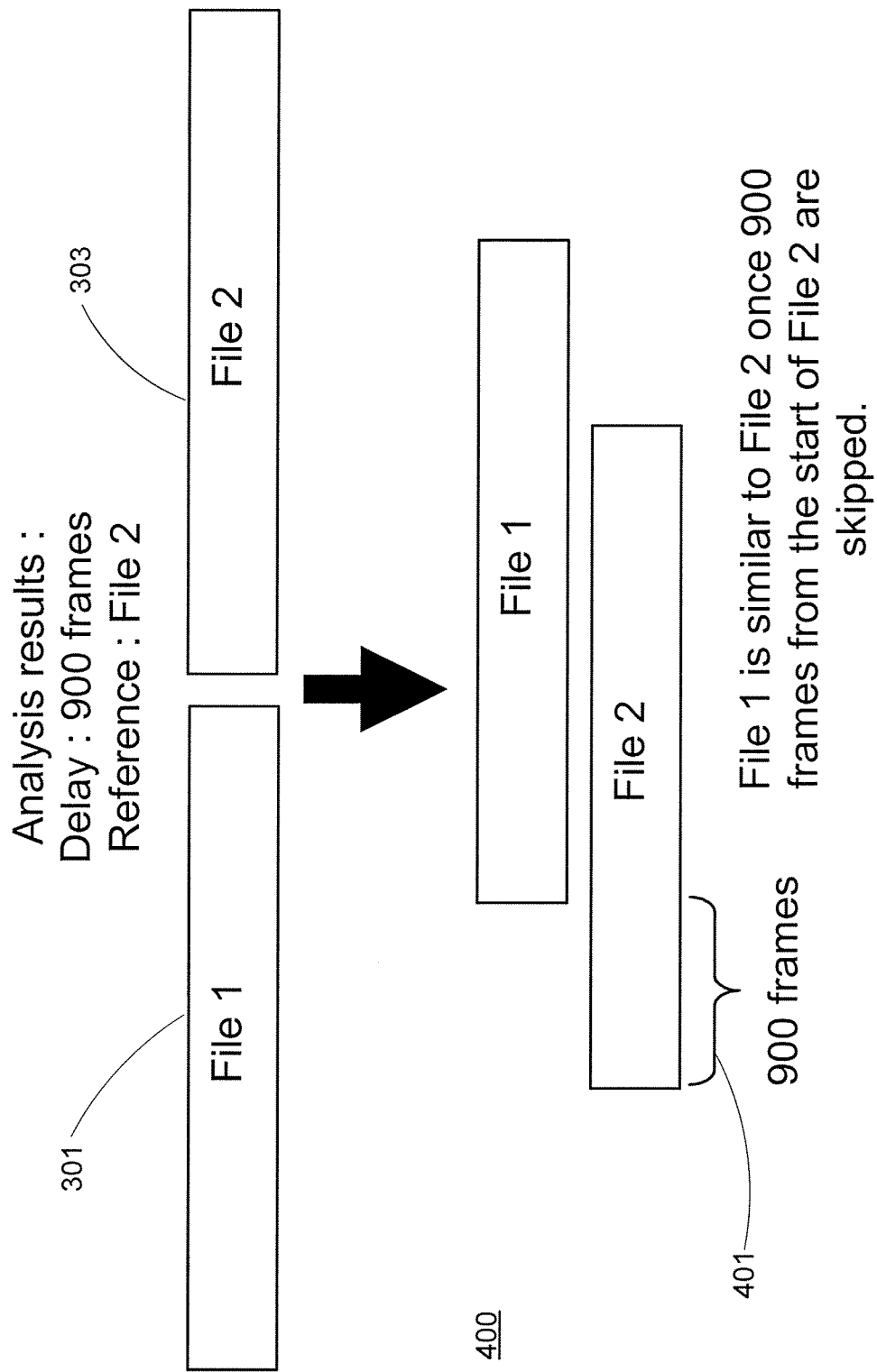
FIG. 4 shows a process for analyzing energy characteristics of two files having audio content in accordance with an embodiment of the invention.

FIG. 4 shows scenario 400 for analyzing energy characteristics of files 301 and 303 having audio content in accordance with an embodiment of the invention. Scenario 400 illustrates how analysis results 313 may be interpreted. For example, files 301 and 303 share the same content after certain number of frames 401 is skipped from the second file 303. As the compressed formats operate in block basis also the delay is given in block domain.

While FIG. 4 depicts comparing two files, more than two files may be compared for similarity. For example, after comparing two files, another file may be compared to one of the two files 301,303.

Since the frame size is fixed for each format, the conversion of the delay in time (e.g., milliseconds) is determined from the given sample rate. In general, the delay in milliseconds for the given frame delay can be determined as follows $$delay_{ms} = delay_{frames} \cdot \frac{frame\_length}{sample\_rate} \cdot 1000 \qquad (EQ.\ 1)$$

Figure 5:
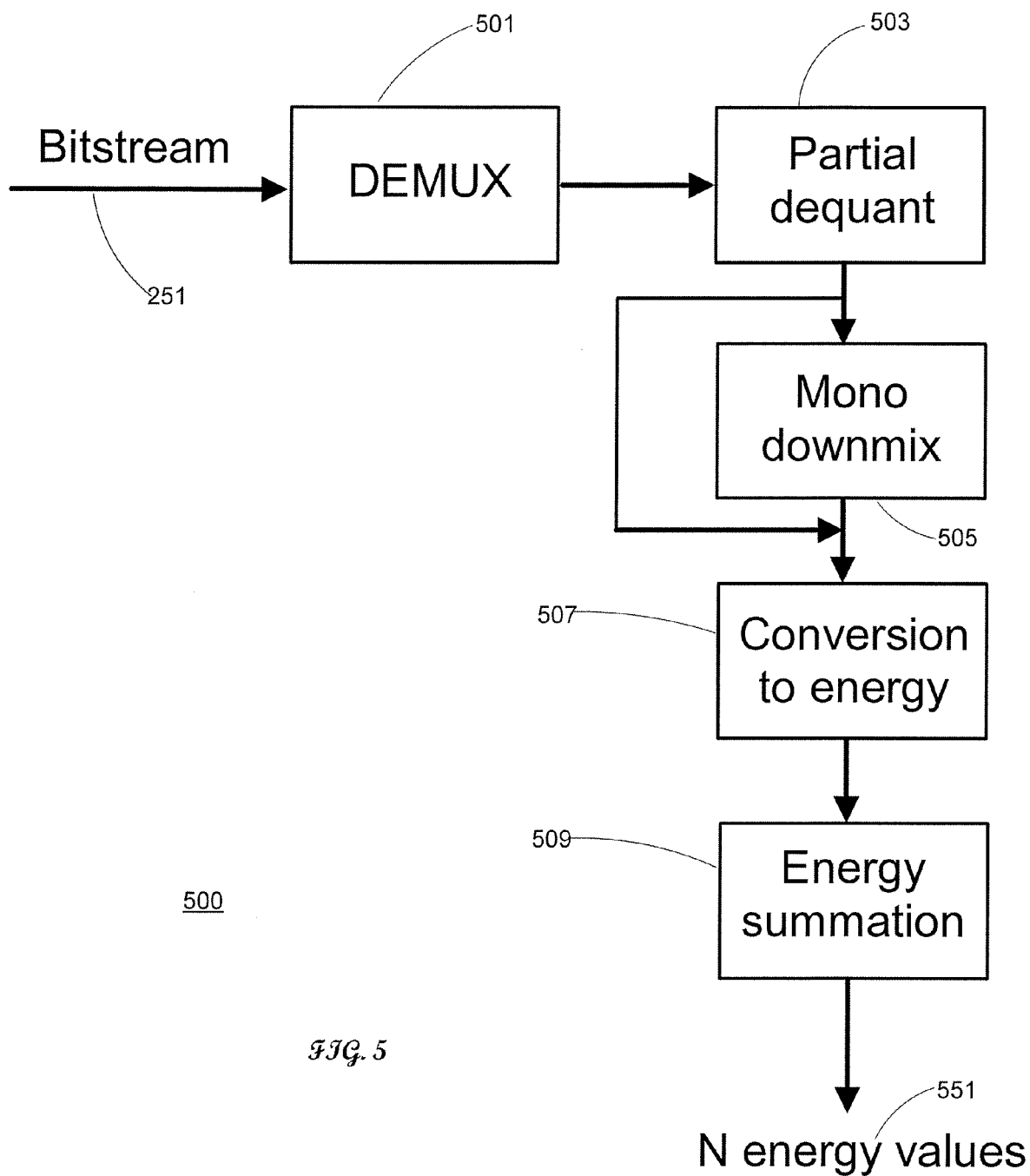
FIG. 5 shows apparatus for analyzing audio content for a stereo channel in accordance with an embodiment of the invention.

FIG. 5 shows apparatus 500 for analyzing audio content for a stereo channel in accordance with an embodiment of the invention. First, a limited number of quantized values (N) are extracted from bit stream 251 by de-multiplexing module 501. With an AAC format, bit stream 251 may include a maximum of 48 full-bandwidth audio channels. De-multiplexing module 501 separates the multiplexed audio channels from bit stream 251. In general, the corresponding audio bandwidth of N quantized values can be converted to a frequency range (in Hz) as follows $$fraquency\_range = N \cdot \frac{sample\_rate}{2 \cdot frame\_length} \qquad (EQ.\ 2)$$

With an embodiment of the invention, the lowest 60 quantized values are used in the sub-sampled domain (which is typically less than the Nyquist rate of the corresponding audio signal). The sub-sampled rate corresponds to approximately 1292 Hz at a 44.1 kHz sampling rate with a frame size of 1024 samples (frame size used in AAC encoding). The following description corresponds to an AAC format but embodiments of the invention support other perceptual formats.

The 60 quantized samples are divided into 5 frequency bands according to $$energyOffset[6] = \{0, 10, 20, 30, 40, 60\} \qquad (EQ.\ 3)$$

Module 503 then extracts quantized values and de-quantizes the value to obtain the corresponding amplitude level for each value from the following relationship:

$$\tilde{q}(i) = sign(q(i)) \cdot |q(i)|^{\frac{4}{3}} \cdot 2^{0.25 \cdot step\_size(i)},\ 0 \leq i < 60 \qquad (EQ.\ 4)$$

$$sign(x) = \begin{cases} 1, & x \geq 0 \\ -1, & otherwise \end{cases}$$

where q and step_size are the quantizer values and step sizes, respectively. These values are extracted from the bit stream 251.

When bit stream 251 is encoded as a channel pair (i.e., a stereo channel) mono downmix module 505 generates a combined value from each pair of de-quantized values. This operation reduces complexity in the energy matching stage to be discussed later. The mono downmix output is determined as follows:

$$\tilde{q}(i)_M = \frac{\tilde{q}(i)_L + \tilde{q}(i)_R}{2},\ 0 \leq i < 60 \qquad (EQ.\ 5)$$

where $\tilde{q}_L$ and $\tilde{q}_R$ are the de-quantized values of the left and right channels, respectively.

Next, the de-quantized values are converted to energy domain by module 507 as follows:

$$e(i) = \tilde{q}_M(i)^2,\ 0 \leq i < 60 \qquad (EQ.\ 6)$$

Module 509 then determines the total energy for each frequency band as follows:

$$E(i) = \sum_{j=energyOffset\,(i)}^{energyOffset\,(i+1)-1} e(j), \, 0 \le i < 5 \quad (EQ. 7)$$

As will be discussed, the total energy values for the frequency bands represent the energy characteristics of each file.

Apparatus 500 may assume different forms, including discrete logic circuitry, a microprocessor system, or an integrated circuit such as an application specific integrated circuit (ASIC).

FIG. 6 shows process 600 for matching energy characteristics for two files having audio content in accordance with an embodiment of the invention. Best content match is searched for at different delay instances in step 603. In an exemplary embodiment, 10 different delay instances are used to add robustness and reliability to the search results. In step 605, the best delay instance is selected among the calculated values. Since it is not known which file has the delay in the content, both files are searched for the best match in step 607. In the first round, as determined in step 601, the first file is set as a reference candidate and a best content match is searched from the second file. In the next round, the second file is set as reference candidate and a best content match is searched from the first file. Finally, a selection is made to get the best content match between the two reference candidates.

The following discussion illustrates pseudo-code that exemplifies the above discussion. The best content match for each delay instance is calculated according to following pseudo-code.

```
GetBestDelay(frameSize, numberOfBands, startIdx, lagOffset, cLines,
            Pointer *coefValues[2], Pointer *cL)
{
  minError;
  i, j, bestLag, lagIdx;
  lagIdx = 0;
  bestLag = -1;
  minError = 1E+35f;
  for(i = startIdx ; i < (cLines - numberOfBandS); i+=frameSize,
                                      lagIdx+=1)
  {
    for(j = 0, crossCorr = 0.0f; j < numberOfBands; j++)
    {
      errorValues = coefValues[0][j + lagOffset * frameSize] -
                            coefValues[1][i + j];
      crossCorr += errorValues * errorValues;
    }
    if(crossCorr < minError)
    {
      bestLag = lagIdx;
      minError = crossCorr;
    }
  }
  *cL = minError;
  return (bestLag);
}
``` where framesize is the number of frequency bands, numberOfBands is number of frequency bands used for correlation analysis, coefValues[2] hold the energy values for each frequency band for the files, and cLines is the number of samples present in coefValues[2] (i.e., the number of frequency bands). The other parameters will be explained in the following sections.

The best content match at different delay instances is calculated according to:

```
for(lagOffset = 4, lagIdx2 = 0;lagOffset < nDelayInstances;
                           lagOffset+=lagInc)
{
  i = lagOffset * frameSize;
  bestLag = GetBestDelay(frameSize,windowSize * frameSize,
         i,lagOffset,cLines, coefValuesInt, &cL);
  gItem[lagIdx2].gainIndex = bestLag;
  gItem[lagIdx2++].nmrValue = cL * 1E-10f;
  windowSize = MAX(10, windowSize - 5);
}
``` where nDelayInstances is the number of delays instances, lagInc is the increment size for each delay instance, frameSize is the number of frequency bands present in each frame, and windowSize is the number of frames used for the correlation analysis in the GetBestDelay( ) function. As can be seen the window size is decreased for each delay instance to further reduce the complexity. gItem variable is used to save the best delay at each delay instance for later selection. The remaining parameters will be explained the following sections.

The gItem array is sorted to decreasing order of importance, that is, the delay instance having the largest correlation appears first, the delay instance having the second largest correlation appears second, and so on.

The minimum and average delay difference with respect to the smallest correlation is determined as follows:

```
aveDiff = 0; mDiff = 0; count = 0;
for(i = lagIdx2 - 2; i >= 0; i--)
{
  tmpDiff = abs(gItem[lagIdx2 - 1].gainIndex - gItem[i].gainIndex);
  if(mDiff > tmpDiff)
     mDiff = tmpDiff;
  aveDiff += tmpDiff;
  count++;
}
``` where abs returns the absolute value of the specified input.

The allowed delay distance from the smallest correlation is then determined according to:

$$allowedDiff = \lfloor 0.9 \cdot mDiff + (aveDiff/count) \cdot 0.1 \rfloor$$

Next, the number of instances within allowed delay range are calculated according to:

```
for(j = 0; j < 2; j++)
{
  distanceCount2[j] = 0;
  for(i = lagIdx2 - 2 - j; i >= 0; i--)
  {
    tmpDiff = abs(gItem[lagIdx2 - 1].gainIndex - gItem[i].gainIndex);
    if(tmpDiff < allowedDiff)
       distanceCount2[j] += 1;
  }
}
```

In addition to counting the number of instances within the allowed range also the number of neighbouring instances are counted where the distance to neighbouring delay is only few frames (with the exemplary embodiment, 10 is the maximum number of instances) as follows:

```
bestCount = 0; bestIndex = lagIdx2 − 1;
bestCorr = gItem[lagIdx2 − 1].nmrValue;
for(dev = 0; dev < 10; dev++)
{
  for(j = lagIdx2 − 1; j >= lagIdx2 − 5; j−−)
  {
    for(g = lagIdx2 − 1, c = 0; g >= 0; g−−)
      if(g != j)
        if(gItem[g].gainIndex − dev <= gItem[j].gainIndex &&
            gItem[g].gainIndex + dev >= gItem[j].gainIndex)
          c++;
    if(bestCount < c)
    {
      bestCount = c;
      bestCorr = gItem[j].nmrValue;
      bestIndex = gItem[j].gainIndex;
    }
  }
}
```

Finally the best delay is selected for the content:

```
if(bestCount > 1)
{
  bestFound[loop] = 1;
  distanceCount[loop] = bestCount;
  if(distanceCount2[0])
    distanceCount[loop] *= distanceCount2[0];
  lagSelected[loop] = bestIndex;
  corrSelected[loop] = bestCorr;
}
else
{
  if(distanceCount2[0] >= distanceCount2[1])
  {
    distanceCount[loop] = distanceCount2[0];
    lagSelected[loop] = gItem[lagIdx2 − 1].gainIndex;
    corrSelected[loop] = gItem[lagIdx2 − 1].nmrValue;
  }
  else
  {
    distanceCount[loop] = distanceCount2[1];
    lagSelected[loop] = gItem[lagIdx2 − 2].gainIndex;
    corrSelected[loop] = gItem[lagIdx2 − 2].nmrValue;
  }
}
```

The above steps are repeated for each file. In the first round the parameters are:

```
loop = 0;
coefValuesInt[0] = Energy_Value_File_1;
coefValuesInt[1] = Energy_Value_File_2;
``` and in the second round the parameters are:

```
loop = 1;
coefValuesInt[0] = Energy_Value_File_2;
coefValuesInt[1] = Energy_Value_File_1;
```

The following parameters remain the same in both rounds:

```
frameSize = 5;
windowSize = 10;
cLines = MIN(file_size1, file_size2) / frameSize;
nDelayInstances = 10;
lagInc = cLines / nDelayInstances;
```

Finally, the output parameters are determined as follows:

```
if(distanceCount[0] || distanceCount[1])
{
  if(corrSelected[0] && corrSelected[1])
  {
    if(distanceCount[0] >= distanceCount[1] &&
        corrSelected[0] <= corrSelected[1] &&
        lagSelected[0] > −1)
      printf("Delay : %i (File 2)\n", lagSelected[0]);
      printf("Degree of content similarity : %i\n", bestCount[0] /
        nTotal[0]);
    else if(distanceCount[0] < distanceCount[1] &&
        corrSelected[0] > corrSelected[1] &&
        lagSelected[1] > −1)
      Printf("Delay : %i (File 1)\n", lagSelected[1]);
      printf("Degree of content similarity : %i\n", bestCount[1] /
        nTotal[1]);
    Else
      Printf("No correlation!\n");
  }
  Else
  {
    if(distanceCount[0] >= distanceCount[1] &&
        bestFound[0] &&
        lagSelected[0] > −1)
      printf("Delay : %i (File 2)\n", lagSelected[0]);
      printf("Degree of content similarity : %i\n", bestCount[0] /
        nTotal[0]);
    else if(distanceCount[0] < distanceCount[1] &&
        bestFound[1] &&
        lagSelected[1] > −1)
      printf("Delay : %i (File 1)\n", lagSelected[1]);
      printf("Degree of content similarity : %i\n", bestCount[1] /
        nTotal[1]);
    else
      printf("No correlation!\n");
  }
}
else
  Printf("No correlation!\n");
```

The above exemplary embodiment measures a degree of content similarity. With the exemplary embodiment, best-Count[0] is the bestCount value calculated using the first round of parameters and bestCount[1] is the bestCount value calculated using the second round of parameters. In addition, the nTotal parameter describes the number of delay instances, excluding the lag value −1. In other words, $$nTotal = \sum_{i=0}^{lagIdx2-1} \begin{cases} 1, & gItem[i].gainIndex \mathrel{!}= -1 \\ 0, & \text{otherwise} \end{cases} \quad (\text{EQ. 8})$$

This value is also calculated for both rounds as illustrated in the above pseudo-code. The degree of similarity varies between 0 (different) and 1 (files are 100% similar). This value can be directly used as an indication of how similar the content between the files is.

Figure 7:
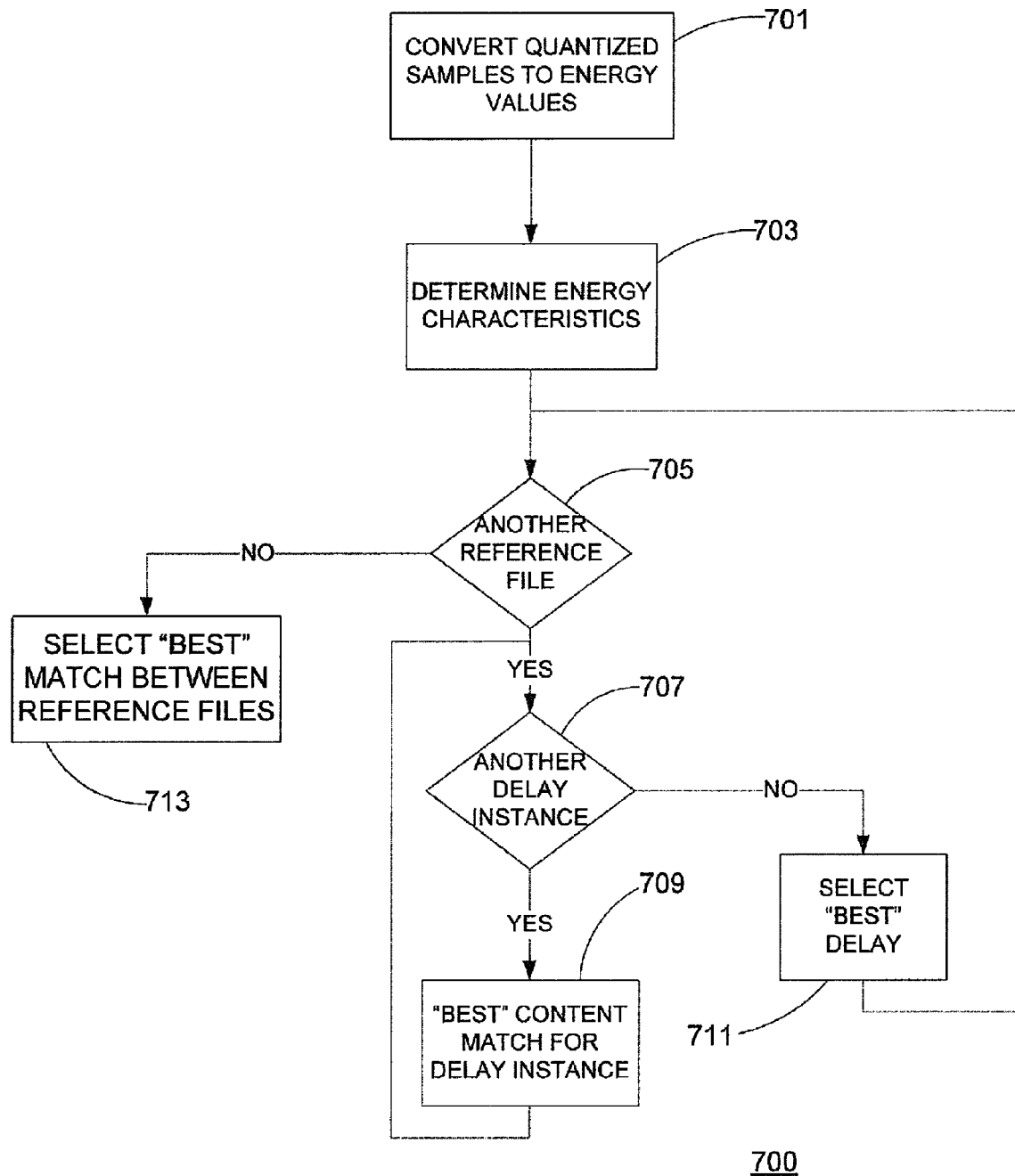
FIG. 7 shows a flow diagram for determining whether content of two files is similar in accordance with an embodiment of the invention.

FIG. 7 shows flow diagram 700 for determining whether content of two files is similar in accordance with an embodiment of the invention. In step 701, quantized samples from files having audio content with a compressed format are converted to energy values e(i) using EQ. 6. To reduce the number of processed samples, N samples with the lowest quantized values are used. In step 703, energy characteristics are determined using EQ. 7, from which the total energy for each frequency band is calculated.

In step 705, one of the two files is designated the reference file in order to provide a reference for the determined delay. (If the files have similar content, then either the second file lags the first file or the first file lags the second file.) Steps 707-711 are repeated for each file being selected as the reference file.

Step 707 determines whether there is another delay instance to be processed. If not, then the "best" content match is determined in step 709 (corresponding to a largest correlation between frequency characteristics) as discussed above. If there are no further delay instances, then the "best" delay is selected in step 711 as discussed above. (One should note that the "best" selection is in relation to the metric used by an embodiment.) If each file has been processed as the reference file, then the "best" match is selected in step 713. The results from step 713 are typically provided to a user through user interface 209 as shown in FIG. 2.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A method comprising:
   accessing a first file and a second file, wherein the first file and the second file include compressed audio content;
   collecting compressed audio content samples from the compressed audio content of the first file and from the compressed audio content of the second file;
   converting the compressed audio content samples to energy values;
   determining energy characteristics from the energy values;
   matching the energy characteristics to obtain a greatest content match with respect to a plurality of delay instances; and
   selecting a delay value based on the greatest content match, the selected delay value corresponding to an offset between the first file and the second file.

2. The method of claim 1, further comprising:
   determining a degree of similarity that relates content of the first file and the second file; and
   displaying at least one of the selected delay value and the degree of similarity.

3. The method of claim 1, further comprising:
   wherein selecting the delay value includes determining the delay value from delay characteristics of the plurality of delay instances.

4. The method of claim 1, further comprising:
   determining a limited number of the compressed audio content samples to be extracted from a bit stream; and
   extracting the limited number of the compressed audio content samples from the bitstream.

5. The method of claim 1, further comprising:
   de-quantizing the compressed audio content samples to obtain de-quantized samples corresponding to amplitude levels.

6. The method of claim 5, further comprising:
   combining the de-quantized samples from a right channel and a left channel of a stereo audio signal to form the energy values.

7. The method of claim 1, further comprising:
   partitioning a frequency spectrum into a plurality of frequency bands; and
   determining a total energy value for each said frequency band for the first file and the second file.

8. The method of claim 7, further comprising:
   correlating the total energy values for the first file and the second file.

9. The method of claim 1, further comprising:
   replacing the first file or the second file with a reference file; and
   repeating the steps of matching the energy characteristics and selecting the delay value based on the reference file.

10. The method of claim 1, further comprising:
    collecting second compressed audio content samples from compressed audio content of a third file;
    converting the second compressed audio content samples to second energy values;
    determining second energy characteristics from the second energy values;
    matching the second energy characteristics to obtain a second greatest content match with respect to a second plurality of delay instances; and
    select a second selected delay value from the second plurality of delay instances, the second selected delay value corresponding to an offset between the first file and the third file for relating content of the first file and the third file.

11. The method of claim 1, wherein the compressed audio content of the first file and the compressed audio content of the second file both conform to an advanced audio coding (AAC) format or a Moving Picture Experts Group (MPEG)-1 Layer III (MP3) format.

12. The method of claim 1, wherein the compressed audio content of the first file conforms to a first compression format and the compressed audio content of the second file conforms to a second compression format different than the first compression format.

13. The method of claim 1, further comprising:
    organizing a data structure that includes the first file and the second file based on a determined similarity between the first file and the second file.

14. The method of claim 1, wherein both the first file and the second file include compressed multi-media content.

15. An apparatus comprising:
    one or more processors; and
    at least one memory storing computer-executable instructions that, with the one or more processors, cause the apparatus to at least:
    access a first file and a second file, wherein the first file and the second file both include compressed audio content;
    collect compressed audio content samples from the compressed audio content of the first file and from the compressed audio content of the second file,
    convert the compressed audio content samples to energy values,
    determine energy characteristics from the energy values, match the energy characteristics to obtain a greatest content match with respect to a plurality of time delay instances, and select a delay value based on the greatest content match, the selected delay value corresponding to an offset between the first file and the second file.

16. The apparatus of claim 15, wherein the at least one memory further stores computer-executable instructions that, with the one or more processors, cause the apparatus to:

determine a degree of similarity that relates content of the first file and the second file, and display at least one of the degree of similarity and the selected delay value.

17. A non-transitory computer-readable medium storing computer-executable instructions that, when executed, cause an apparatus to at least:

access a first file and a second file, wherein the first file and the second file include compressed audio content;

collect compressed audio content samples from the compressed audio content of the first file and from the compressed audio content of the second file;

convert the compressed audio content samples to energy values;

determine energy characteristics from the energy values for the first file and the second file;

match the energy characteristics to obtain a greatest content match with respect to a plurality of delay instances; and select a delay value based on the greatest content match, the selected delay value corresponding to an offset between the first file and the second file.

18. The non-transitory computer-readable medium of claim 17, further storing computer-executable instructions that, when executed, cause the apparatus to:

determine a degree of similarity that relates content of the first file and the second file, and display at least one of the degree of similarity and the selected delay value.

19. The non-transitory computer-readable medium of claim 17, further storing computer-executable instructions that, when executed, cause the apparatus to:

partition a frequency spectrum into a plurality of frequency bands; and determine a total energy value in each said frequency band for the first file and the second file.

20. The non-transitory computer-readable medium of claim 19, further storing computer-executable instructions that, when executed, cause the apparatus to:

correlate the total energy values for the first file and the second file.

21. The non-transitory computer-readable medium of claim 17, further storing computer-executable instructions that, when executed, cause the apparatus to:

determine a limited number of the compressed audio content samples to be extracted from a bit stream; and extract the limited number of the compressed audio content samples from the bitstream.

22. The non-transitory computer-readable medium of claim 17, wherein both the first file and the second file include compressed multi-media content.

23. The apparatus of claim 15, wherein the at least one memory further stores computer-executable instructions that, with the one or more processors, cause the apparatus to:

determine a limited number of the compressed audio content samples to be extracted from a bit stream; and extract the limited number of the compressed audio content samples from the bitstream.

24. The apparatus of claim 15, wherein both the first file and the second file include multi-media content.

25. The method of claim 1, wherein collecting the compressed audio content samples includes collecting a portion of the compressed audio content samples at a rate dependent on one or more encoding properties of the first file, wherein the encoding properties include a frame size used to encode the first file and a sampling rate used to encode the first file.

26. The method of claim 1, wherein the delay value is in a block domain based on a compression format of the first file or a compression format of the second file.

* * * * *